(12) United States Patent
Fox

(10) Patent No.: US 7,691,195 B2
(45) Date of Patent: *Apr. 6, 2010

(54) COMPOSITIONS OF PELLETS OF TACKY, DEFORMABLE MATERIAL DISPERSED WITHIN A FINE FLOWABLE MATERIAL AND METHODS OF MAKING THE COMPOSITIONS

(76) Inventor: Steve A. Fox, 385 Bartlett Brook Rd., South Pomfret, VT (US) 05067

( * ) Notice: Subject to any disclaimer, the term of this patent is extended or adjusted under 35 U.S.C. 154(b) by 674 days.

This patent is subject to a terminal disclaimer.

(21) Appl. No.: 11/474,923

(22) Filed: Jun. 26, 2006

(65) Prior Publication Data

US 2006/0288907 A1 Dec. 28, 2006

Related U.S. Application Data

(60) Provisional application No. 60/693,873, filed on Jun. 24, 2005.

(51) Int. Cl.
*C08L 95/00* (2006.01)

(52) U.S. Cl. ............... 106/281.1; 106/282; 106/284.01; 106/284.02; 106/284.03; 106/284.04; 106/284.05

(58) Field of Classification Search ............. 106/281.1, 106/282, 284.01, 284.02, 284.03, 284.04, 106/284.05

See application file for complete search history.

(56) References Cited

U.S. PATENT DOCUMENTS

| | | |
|---|---|---|
| 1,354,076 A | 9/1920 | Stephens |
| 3,026,568 A * | 3/1962 | Moar ............................. 264/7 |
| 3,196,487 A | 7/1965 | Snelling |
| 3,632,418 A | 1/1972 | Draper |
| 3,783,000 A | 1/1974 | Takase et al. |
| 3,905,587 A | 9/1975 | Preeman |
| 3,965,281 A | 6/1976 | Takase et al. |
| 4,728,276 A | 3/1988 | Pauley et al. |
| 4,769,288 A * | 9/1988 | Saylak ........................ 106/274 |
| 4,784,216 A | 11/1988 | Bracegirdle et al. |
| 4,859,502 A | 8/1989 | Astrope et al. |
| 5,254,385 A | 10/1993 | Hazlett |
| 5,290,833 A * | 3/1994 | Schmanski .................... 524/71 |
| 5,414,197 A * | 5/1995 | Wakeley et al. ................. 588/3 |
| 5,637,350 A * | 6/1997 | Ross ........................... 427/212 |
| 5,688,449 A | 11/1997 | Fox |
| 6,120,899 A | 9/2000 | Cameron et al. |
| 6,238,732 B1 | 5/2001 | Cameron et al. |
| 6,440,205 B1 * | 8/2002 | Bailey et al. ................. 106/275 |

(Continued)

OTHER PUBLICATIONS

"Hot Mix Asphalt Materials, Mixture Design and Construction", NCAT, pp. 417-419 (1991).

(Continued)

*Primary Examiner*—Helene Klemanski
(74) *Attorney, Agent, or Firm*—Jenkins, Wilson, Taylor & Hunt, P.A.

(57) ABSTRACT

Compositions of discrete substances that are capable of being mixed together to form a composite material and methods for making the compositions are disclosed. The composition includes a plurality of pellets of a tacky, deformable material at an ambient temperature dispersed within a flowable fine material. The fine material occupies the interstices between the plurality of pellets in a manner that minimizes pellet to pellet contact.

21 Claims, 9 Drawing Sheets

U.S. PATENT DOCUMENTS

| | | | |
|---|---|---|---|
| 6,824,600 B2 * | 11/2004 | Bailey et al. | 106/284.05 |
| 6,863,724 B2 * | 3/2005 | Bailey et al. | 106/281.1 |
| 2003/0070579 A1 | 4/2003 | Hong et al. | |
| 2008/0224345 A1 * | 9/2008 | Fox | 264/176.1 |

OTHER PUBLICATIONS

Non-final Office Action for U.S. Appl. No. 12/150,120 dated Oct. 15, 2009.

BusinessKnowledgeSource.com, Manufacturing Info Website: (Sep. 22, 2009) http://www.businessknowledgesource.com/manufacturing/continuous_production_028688.html.

Indiana Department of Transportation, Certified Hot Mix Asphalt Technician Manual, pp. 4-22, Web: http://www.in.gov/indot/3434.html, Sep. 24, 2009.

Nichireki Ch Ind KK, Pavement composition which does not require use of heat consist of cement aggregate and asphalt emulsion, JP 52087829, Jul. 22, 1977, Derwent Abstract.

* cited by examiner

COMPOSITIONS OF PELLETS OF TACKY, DEFORMABLE MATERIAL DISPERSED WITHIN A FINE FLOWABLE MATERIAL AND METHODS OF MAKING THE COMPOSITIONS

RELATED APPLICATIONS

This application claims priority to U.S. Provisional Patent Application Ser. No. 60/693,873, filed Jun. 24, 2005, the disclosure of which is incorporated herein by reference in its entirety.

TECHNICAL FIELD

The subject matter relates, in general, to compositions of tacky material disposed within a fine material and methods of making such compositions. More particularly, the invention relates to compositions of a plurality of pellets of tacky, deformable material, such as asphalt, dispersed within fine material, such as powder or fibers, used in a final formula of composite materials, such as asphaltic mixtures, in a manner that allows the compositions to be flowable, transportable, and stable.

BACKGROUND

Often, in various industries, a tacky material which tends to stick to other substances with which it comes in contact will be mixed with a powder or fibrous material to create a composite material having various uses and properties that are enhanced in comparison to either the tacky material or the powder material, alone. For example, asphalt used in asphaltic mixtures for use in paving, road surfacing, roofing, etc., is often mixed with granular or fine powder, such as limestone, to enhance or change the properties of the asphalt material. For example, fine powdered limestone may be added to asphalt to increase stability when used to cover shingles for roofing. Further, limestone, fine aggregates, and cellulosic or mineral fibers may be added to asphalt to increase its sealing properties for filling in cracks in construction or road surfacing. The addition of such powder or fibers allows asphalt to still have its securing properties, while permitting the asphalt to be handled and manipulated more easily to provide more accurate and stable sealing. Further, the addition of fine aggregate, limestone, cellulosic fibers, or mineral fibers also can help create asphaltic mixtures for paving and road surfacing that have improved strength and durability.

The transport of such asphalt to be used as binder in the various asphaltic mixture applications can be problematic. Typically, asphalt is handled in bulk form due to the fact that the material tends to stick together even after separation when stored in the same container. During processing in anticipation for use, the asphalt must be kept heated at over 275° F. in liquid form for subsequent handling and mixing. For example, asphalt binder is handled as a hot liquid from its origination point, usually the refinery, with heated rail cars or trucks. The asphalt binder remains heated in its liquefied state through shipment to and use in the asphalt mix plant. Since such material must be maintained at elevated temperatures for transfer to storage tanks and any transfer from one container to another until ultimate use, significant amounts of energy in the form of heat must be expended in order to maintain the asphalt in its liquefied state. It is estimated that, in the United States alone, over 60 billion pounds of asphalt must be kept continuously heated. Depending on any additives or other materials added to the asphalt, maintaining the asphalt at elevated temperatures for prolonged periods can adversely affect the properties of the asphalt.

Different techniques have been implemented in an attempt to improve the handling properties of tacky, deformable materials, such as asphalt, to allow more flexibility in its use and decrease the exorbitant amount of energy expended to keep such materials at the necessary elevated temperatures. For example, U.S. Pat. No. 5,254,385 to Hazlett discloses encapsulating asphalt with polymer capsules so that the encapsulated asphalt may be handled at ambient temperatures without the asphalt coagulating or coalescing together to make the asphalt unwieldy for use in various situations. However, the asphalt within the polymer capsules is still deformable and can be easily deformed under even slight pressure. Thus, if the polymer encapsulated asphalt is stored in conventional shippable containers having a height of, for example, two to three feet or more, the weight of the asphalt-filled capsules creates a pressure on the internal capsules. Under this pressure, the soft and malleable asphalt will deform within each capsule such that the capsules may interlock, thus preventing free flowing of the asphalt from the container. Also, the polymer covers may easily be compromised by cracks and fractures within the capsule walls. Thereafter, the individual capsules will start to adhere to one another. The adhering of large amounts of the asphalt-filled capsules makes them hard to manipulate in producing small batches of asphaltic mixture. In extreme cases, the capsules of asphalt may fracture and burst allowing the asphalt to coalesce together further complicating small batch uses. Additionally, the plastic covers used to encapsulate the asphalt may prevent the asphalt from properly adhering to the aggregate when melted.

U.S. Pat. No. 3,783,000 discloses a granular or flaky asphalt material that can be blended with limestone or other fine aggregate material to create a fully blended composite asphalt that can be manipulated and handled by adding pressure between rollers. However, the composite material must be broken off and then crushed into the specified amounts within batch applications. Such composite material is not flowable and cannot be easily metered for use in specified amounts for either large or small batch applications. Also, storage of this material in large containers can cause agglomeration due to interlocking of particles.

SUMMARY

According to certain aspects of the present subject matter, a composition is provided that includes pellets of tacky, deformable material and fine material that are part of a final formula of a composite material, such as an asphaltic mixture, in a manner that allows the composition to be flowable, transportable, and stable.

According to certain other aspects of the present subject matter, a composition of discrete substances that are capable of being mixed together to form a composite material is provided. The composition includes a plurality of pellets of a tacky, deformable material at an ambient temperature dispersed within a flowable fine material. Within the composition, the fine material occupies the interstices between the plurality of pellets in a manner that minimizes pellet to pellet contact.

According to certain other aspects of the present subject matter, a method for making a composition capable of being mixed together to form a composite material at a later point in time is provided. The method includes the steps of providing pellets of a material that is tacky and deformable at ambient temperatures and providing a fine material that is flowable. Simultaneously, the pellets of tacky, deformable material and the fine material are distributed together in sufficient quantities such that there is enough fine material to separate the pellets of tacky, deformable material from one another. The pellets of tacky, deformable material and the fine material are mixed such that the fine material occupies the interstices between the pellets of tacky, deformable material.

According to certain other aspects of the present subject matter, a method for making a composition that comprises at least a portion of a final formula used to form a composite material is provided. The method includes the step of forming pellets of a material that is tacky and deformable at ambient temperatures. The pellets of tacky, deformable material may then be temporarily cooled to a temperature at which the tacky, deformable material of the pellets is rendered non-tacky. A fine material that is flowable is provided. Simultaneously, the pellets of tacky, deformable material and the fine material are distributed together in sufficient quantities such that the fine material is capable of separating the pellets of tacky, deformable material from one another. The pellets of tacky, deformable material and the fine material are mixed such that the fine material occupies the interstices between pellets of tacky, deformable material.

According to other further aspects of the present subject matter, a composition of discrete substances used in a final formula of an asphaltic mixture is provided. The composition includes a plurality of pellets of an asphalt dispersed within a flowable fine material. The fine material occupies the interstices between the plurality of pellets in a manner that minimizes pellet to pellet contact.

Some of the advantages of the present subject matter have been stated hereinabove. Other advantages will become evident as the description proceeds when taken in connection with the accompanying drawings as best described herein below.

BRIEF DESCRIPTION OF THE DRAWINGS

A full and enabling disclosure of the present subject matter including the best mode thereof to one of ordinary skill of the art is set forth more particularly in the remainder of the specification, including reference to the accompanying figures in which.

DETAILED DESCRIPTION

Reference will now be made in detail to presently preferred embodiments of the invention, one or more examples of which are shown in the figures. Each example is provided to explain the subject matter and not as a limitation of the invention. In fact, features illustrated or described as part as one embodiment can be used in another embodiment to yield still a further embodiment. It is intended that the present invention cover such modifications and variations.

Figure 1:
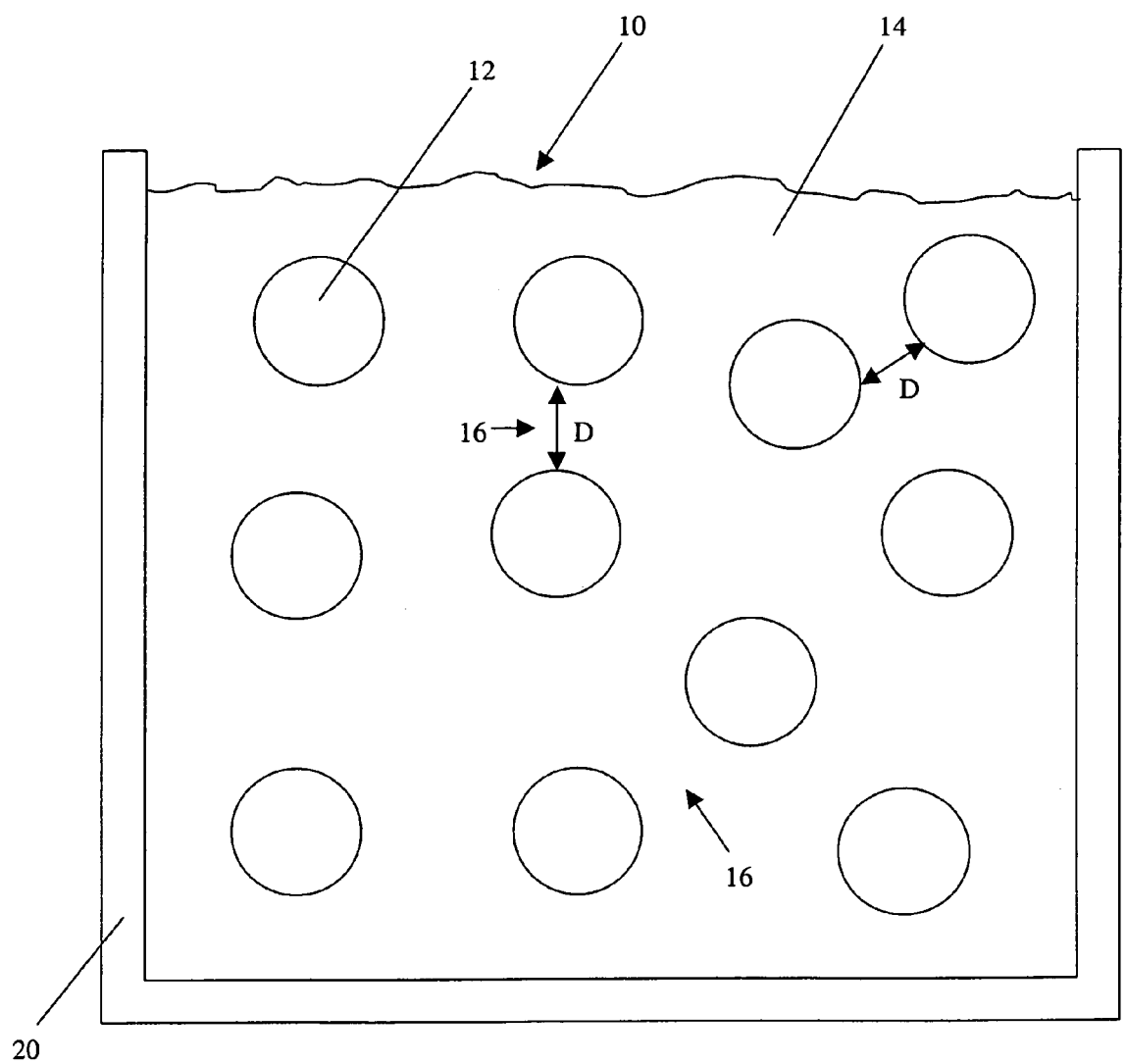
FIG. 1 illustrates a cross-sectional schematic view of a container containing an embodiment of a composition having pellets of a tacky deformal material dispersed within fine material.

FIG. 1 illustrates a composition, generally designated as 10, made of discrete substances that are capable of being mixed together to form a composite material. The composition 10 includes pellets 12 of a material, which is tacky and deformable at ambient temperatures. As used herein, ambient temperatures are between about 60° F. to about 100° F. The composition further includes a fine material 14 that surrounds the pellets of tacky, deformable material effectively separating pellets 12 of the tacky, deformable material from each other.

Fine material 14 comprise loosely held granular, flake, or fiber particles which are not tacky and have a low coefficient of friction between each other to allow the particles to easily slide over one another. In this manner, fine material 14 is effectively flowable such that fine material 14 exhibits similar properties to a liquid. For example, fine material 14 may be pourable. Such fine material 14 will tend to migrate and occupy void areas when fine material 14 is placed into a container.

Pellets 12 of the tacky, deformable material are spaced apart within fine material 14 at distances D that create interstices, generally designated as 16, between pellets 12 of the tacky, deformable material. Fine material 14 surrounds each pellet 12 and fully occupies interstices 16 between pellets 12. Preferably, the distances D between pellets 12 should create interstices 16 that minimize pellets 12 of the tacky, deformable material from contacting one another, thereby preventing the tacky material from coagulating into large clumps. By having fine material 14 occupying the interstices 16 at such distances D, pellets 12 may flow within fine material 14. In this manner, composition 10 of pellets 12 of tacky, deformable material and fine material 14 may be contained in a container 20 that allows composition 10 to be poured from container 20 in incremental amounts. Thereby, small batches of composition 10 may be mixed together alone under heat, or with other substances, to create a composite material having different properties than that of composition 10 with its discrete pellets 12 and fine material 14.

The tacky, deformable material from which pellets 12 are made may be a polymeric resin, which may include homopolymers, copolymers such as, for example, block, graph, random and alternating copolymers, terpolymers, etc., and blends and modifications thereof. For instance, polymeric resins may include ethylene propylene diene monomers ("EPDM"), vinyl acetate polymers, polyurethanes, polyacrylics, or combinations thereof that are tacky and deformable at ambient temperatures. The tacky, deformable material may also be a hot melt adhesive as disclosed in U.S. Pat. No. 6,120,899, which is incorporated herein by reference in its entirety. Further, styrene-butadiene-styrene ("SBS")

polymers or styrene-butadiene-rubber ("SBR") polymers may comprise the tacky, deformable materials, which form pellets 12.

Tacky, deformable material may also include asphalt, which as used herein means any type of asphaltic material. For example, the tacky, deformable material may be bituminous, polymeric asphalt, asphaltum, uinitaite, and uintahite and other hydrocarbon resins used as asphalt or asphalt substitutes. Such material may also include asphalt binder.

These asphalt materials are moldable and tend to stick together at temperature ranges from below 60° F., depending on the material, up to the temperatures at which the materials turn into a more liquid or fluid state. These materials, when formed into small pellets, will tend to coagulate and stick together, if stored together in isolation, making incremental disbursement hard to achieve. When these pellets of material are stored in large amounts by themselves, the pressure of the weight created by the pellets of material upon themselves will not only cause the pellets to coagulate, but also to coalesce forming larger blocks of material. This coalescing especially occurs at points in the storage container where the pressure is high such as towards the bottom.

Fine material 14 should be non-tacky. Fine material 14 may comprise at least one of a powder or fibrous material. For example, fine material 14 may be a powder such as limestone, mineral fines, aggregate fines, hydrated lime, fly ash, sulfur, or ground rubber. The fibers may include such fibers as cellulosic fibers or mineral fibers. Fine material 14 may include any of the powders or fibers listed above or a mixture thereof. The powders used may have a fineness that allows the powders to pass through the sieve designations contained in Table 1, below. For example, the powder may have a fineness that allows the powders to pass through a number 4 sieve, which has openings therein of 0.187 inches. In some embodiments, the powder may have a fineness that allows the powders to pass through a number 20 sieve, which has openings therein of 0.033 inches. In other embodiments, the powders may have a fineness that permit the powders to pass through a number 30 sieve, which has openings of about 0.023 inches. Such fine material creates a solid mixture of non-sticky material that is easily flowable.

When used in asphaltic mixtures, fine material 14 helps to adequately stiffen the asphalt so that the mixture is run resistant and also ensures that drain down of the asphalt within the asphaltic mixture does not occur during construction. Further, besides the powder material that may be added to asphalt to create an asphaltic mixture, as pointed out above, fibers may be added in an asphaltic mixture as stabilizers. There are a number of fiber properties that contribute to the asphaltic mixture including length and thickness. Such properties help prevent drain down within the asphaltic mixture.

Table 1 below illustrates the possible fineness of the powders and fibers, which may be used within composition 10.

TABLE 1

| Sieve Designation | Nominal Sieve Opening | |
|---|---|---|
| | Inches | Millimeters |
| 4 | 0.187 | 4.75 |
| 5 | 0.157 | 4.00 |
| 6 | 0.132 | 3.35 |
| 7 | 0.11 | 2.80 |
| 8 | 0.0937 | 2.36 |
| 10 | 0.0787 | 2.00 |
| 12 | 0.0661 | 1.70 |
| 14 | 0.0555 | 1.40 |

TABLE 1-continued

| Sieve Designation | Nominal Sieve Opening | |
|---|---|---|
| | Inches | Millimeters |
| 16 | 0.0469 | 1.18 |
| 18 | 0.0394 | 1.00 |
| 20 | 0.0331 | 0.85 |
| 25 | 0.0278 | 0.71 |
| 30 | 0.0234 | 0.60 |

Fine material 14 or parts of fine material 14 may comprise different amounts of composition 10 depending on the materials used. For example, if asphalt is the tacky, deformable material, then for 100 parts of asphalt by weight, 1 to 20 parts of fibers by weight may be used. For another example, 1 to 40 parts by weight of hydrated lime may be used for 100 parts of asphalt by weight. In some embodiments, 1 to 50 parts by weight of rubber that has been ground up into fine particles can be used with 100 parts asphalt by weight. In other embodiments, aggregates such as uintaite sold under the trademark GILSONITE by the American Gilsonite Company located in Vernal, Utah, may comprise 10 to 100 parts by weight with 100 parts by weight of asphalt within the mixture.

If a polymeric asphalt material is used as the tacky, deformable material of pellet 12, then SBR or SBS polymers may comprise about 1 percent to about 10 percent of the weight of the polymeric asphalt.

By using such materials in the composition for creating an asphaltic mixture, the composition includes components used within the final formula of the asphaltic mixtures. Thus, the need for the user to have to separately measure out those components contained in the composition is eliminated when making the final asphaltic mixture.

Figure 2:
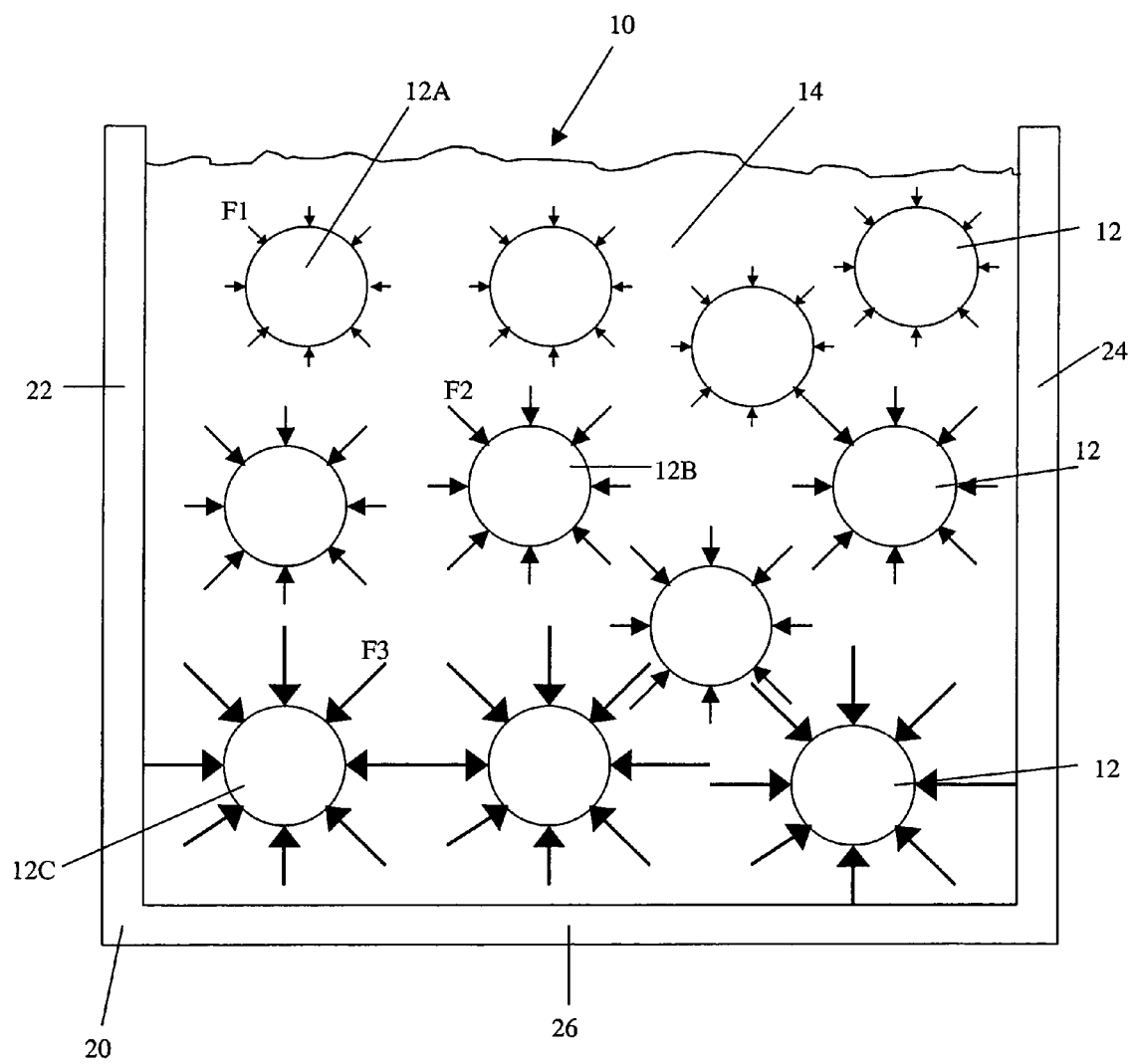
FIG. 2 illustrates a cross-sectional schematic view of a container containing a composition according to FIG. 1 furthering illustrating pressure distribution about the pellets contained therein.

FIG. 2 illustrates the schematic view of composition 10 within container 20 of FIG. 1 illustrating the pressure created on pellets 12 by the weight of composition 10 within container 20. The deeper that pellets 12 are within composition 10 in container 20, the greater the force that will be placed on pellets 12 by the pressure created by the weight of composition 10. Since fine material 14 fills in the free voids and interstices 16 between pellets 12, the force applied against the pellets by the pressure created by the weight of composition 16 is evenly distributed on all sides of pellets 12.

For example, pellets 12A within composition 10 near the top of container 20 have relatively little pressure $F_1$ placed around them by composition 10. Deeper within composition 10 in container 20, greater pressure is placed on pellets 12B in the middle portion of container 20. The uniform pressure is applied circumferentially around pellets 12B. Pellets 12B are under a greater pressure $F_2$ then pellets 12A, which reside within composition 10 near the top of container 20. Pellets 12C of the tacky, deformable material reside at the bottom of composition 10 within container 20. These pellets 12C receive even greater amounts of pressure placed upon them, since the majority of weight of the composition 10 resides above these pellets 12C. The pressure $F_3$ is applied circumferential around the pellets 12C in a uniform manner.

The uniform application of pressure around each of the respective pellets 12A, 12B, 12C of the tacky, deformable material occurs because fine material 14 fully occupies the interstices between pellets 12A, 12B, 12C and fully surrounds pellets 12A, 12B, and 12C. As the pressure is increased within composition 10 and as fine material 14 push inward on pellets 12A, 12B, 12C, counteracting forces from pellets 12A, 12B, 12C push against fine material 14 so that uniform pressures are applied on all sides of pellets 12A, 12B, 12C whether the force of the pressure is great or small. These equally applied pressures prevent, or at least minimize, deformation of pellets 12A, 12B, 12C. Further, since fine material 14 occupies the interstices 16 between pellets 12A, 12B, 12C, and pellets 12A, 12B, 12C are only minimally deformed within composition 10, the pellets do not readily come in contact with one another. Thereby, pellets 12A, 12B, 12C are prevented from coagulating or coalescing together in large amounts even under pressures at which these pellets would normally coagulate and coalesce together when no fine material is placed between such pellets. Further, composition 10 tends to keep pellets 12A, 12B, 12C of deformable material intact at elevated temperatures.

Composition 10 when comprised of asphalt pellets and fine powder can be stored at heights of up to and beyond six feet and temperatures up to and beyond 150° F. without adversely affecting the flowability of the composition. Thereby, incremental use of composition 10 is available, as well as incremental feed into an apparatus for mixing the composition alone or with other materials to make the composite material. By having the composition mixed in such a way that fine material 14 occupies the voids between pellets 12, composition 10 is rendered more stable and more temperature resistant.

Pellets 12 of composition 10 may have a diameter of between about 1/32 of an inch (0.031 inches) to about 3/4 of an inch (0.750 inches). In some embodiments, the diameter of the pellets may range between about 1/8 of inch (0.125 inches) to about 3/8 of an inch (0.375 inches).

The term "container" as used herein is broadly interpreted to encompass not only normal bags and packaging used within different industries, such as the asphalt concrete industry, but also to include truck beds, railway cars and the like. Container 20 may have rigid walls 22, 24 and a rigid bottom 26. Rigid walls 22, 24 help hold the composition in place within container 20 to prevent the unnecessary settling out of the material. Rigid walls 22, 24 help prevent a jostling of the materials that causes either the heavier pellets or the heavier fine material, depending on the materials used for each, from settling to the bottom of the packaging. To further help hold the composition in place, the top of the packaging may be shrink-wrapped to secure the composition until such time that it will be processed. Container 20 can be in any shape or size that is conducive for the end use of composition 10.

Figure 3:
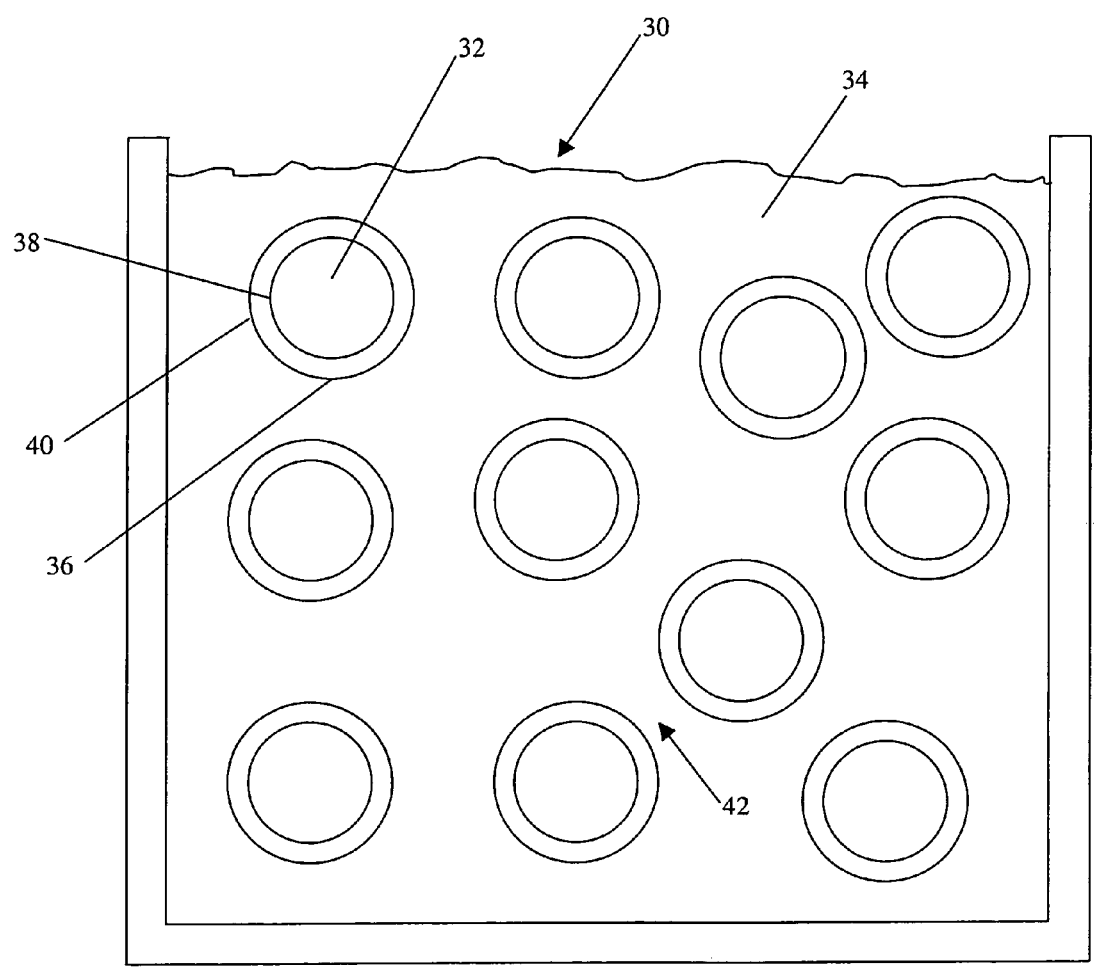
FIG. 3 illustrates a cross-sectional schematic view of a composition according to another embodiment in the present subject matter with coated pellets of a tacky deformal material dispersed within a fine material.

FIG. 3 illustrates another embodiment of the present subject matter in which the composition, generally designated as 30, includes pellets 32 disbursed within fine material 34. Pellets 32 have a coating 36 which surround an outer circumference 38 of pellets 32. Coating 36 may include a polymeric resin or a wax, which provides a non-tacking outer surface 40 for pellets 32. In this matter, even if pellets 32 come in contact with one another, outer coatings 36 of pellets 32 prevent pellets 32 from sticking together. Further, as described above, pellets 32 are disbursed in fine material 34 such that fine material 34 fully occupies interstices 42 between pellets 32. In this manner, as already discussed, the pressure created by the weight of composition 30 is evenly distributed circumferentially on all sides of pellets 32, thereby preventing any deformation of pellets 32 which may compromise coatings 36 surrounding pellets 32. Thus, since pellets 32 are not easily deformed while contained within fine material 34, the flowability of composition 30 is further increased because coatings 36 around pellets 32 are not likely to be compromised. Coatings 36 prevent pellets 32 from sticking together if pellets 32 come in contact with one another.

Alternatively, the coatings around the pellets can be created by a two-step coating process as disclosed in U.S. Pat. No. 5,688,449 to Fox, which is incorporated herein in its entirety. The inner coating layer may be a polymeric binder with a second outer coating layer of a powdery fine material, such as a blowing agent, to provide an outer covering of pellet 32. An embodiment may include fine material 14 as the powdery fine material used as the outer coating layer. The second outer coating layer may further enhance the flowability of the composition.

The embodiments illustrated in FIGS. 1, 2 and 3 may vary in the amount of tacky, deformable material within the pellets and the fine material which surround the pellets within the composition. For example, the pellets of tacky, deformable material may comprise about 50 percent of the composition by volume, while the fine material may also comprise about 50 percent by volume of the composition. Further, depending on the mixture of materials that comprise the fine materials and the type of tacky, deformable material used within the pellets, the percentage of material by weight may also vary. For example, the fine material may comprise at least about 25 percent by weight of the composition. Further, the pellets of tacky material may comprise at least about 25 percent of the weight of the composition. Again, as outlined above, the ratio of materials either by weight or volume within the composition depends on the final formula composite material to be created from the composition and desired properties of the composite material.

Figure 4:
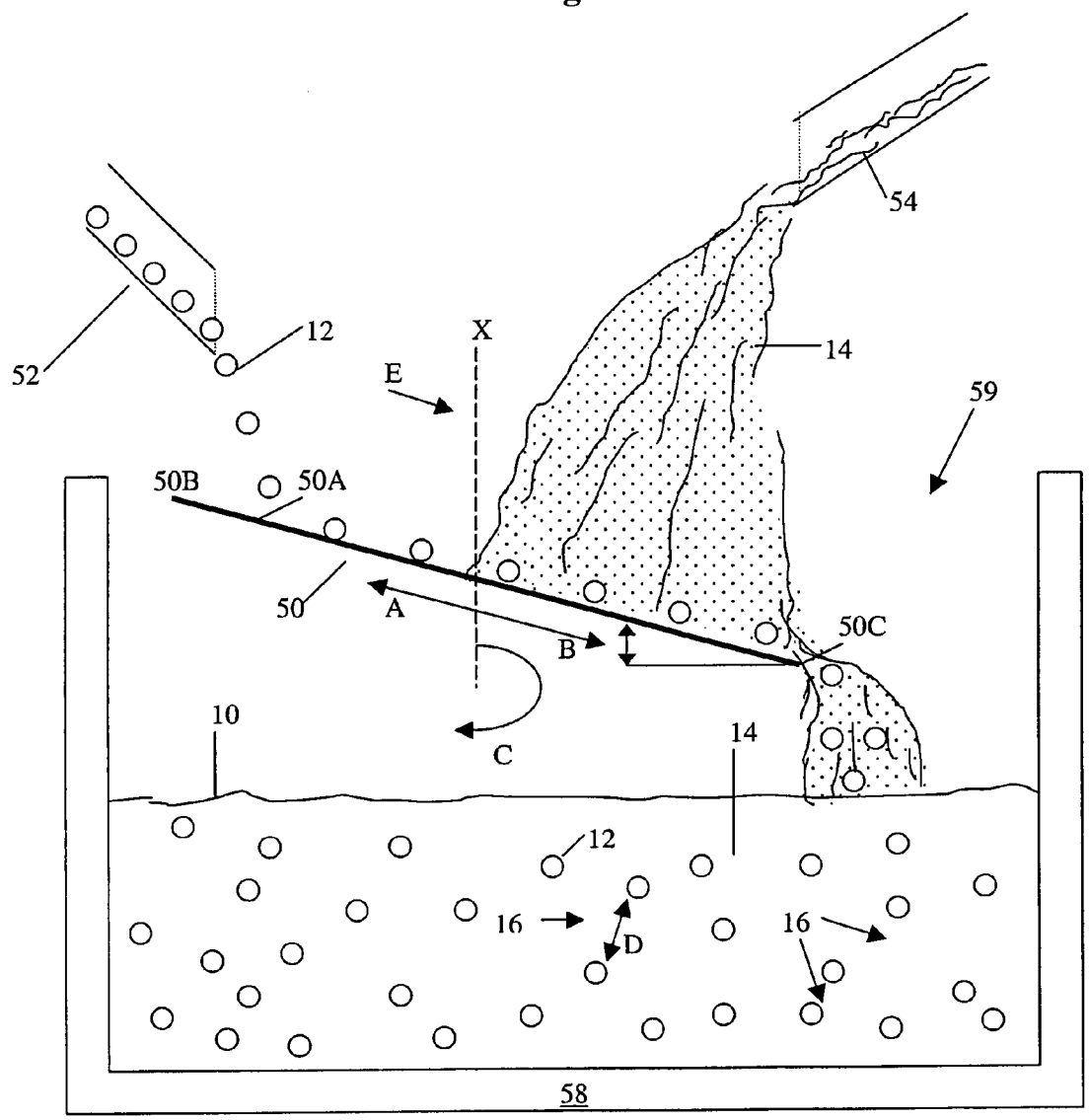
FIG. 4 illustrates a schematic view of an embodiment of a process of creating a composition according to the subject matter.

FIG. 4 illustrates a schematic view of an embodiment for a process of making composition 10. A rotating, vibrating platform 50 is provided on which the pellets 12 and fine material 14 are simultaneously distributed. Pellets 12 are provided for distribution into composition 10 by a pellet feeder 52. A fine material feeder 54 may be provided for facilitating the distribution of fine material 14 into composition 10. A mixing container 58 is provided into which a composition may be distributed as pellets 12 and fine material 14 are mixed together.

Pellet feeder 52 may extend from different pellet forming mechanisms such as a prilling station, an underwater pelletizer, etc. For example, an underwater pelletizer, such as those manufactured by Gala Industries, Inc., of Eagle Rock, Va. may be used. Underwater pelletizers are commonly used within the polymer industry to form pellets. Examples of underwater pelletizers are disclosed in U.S. Pat. No. 4,728,276 and U.S. Pat. No. 3,196,487, both of which are incorporated herein by reference. As an example, the usual underwater pelletizer basically extrudes the tacky, deformable material through a passage way with a rotating cutter blade rotating about the face of the underwater pelletizer. As the tacky, deformable material leaves the passage way out of the face of the underwater pelletizer, the cutter blades cut the strands of extruded material into pellets within a water box which holds water or some other form of liquid that is circulated to cool and harden the pellets. The slurry of pellets is then conveyed to an outlet of the water box. The pellets may then be passed to a dryer, such as a centrifugal dryer, for drying the pellets before they are passed to pellet feeder 52 for disbursement into composition 10. Such dryers are known in the art.

The water or other cooling liquid within the water box of the underwater pelletizer can cool the pellets to a temperature below the ambient temperature that renders the tacky, deformable material temporarily non-tacky and hard. The term "non-tacky" as used herein means that the tackiness of the material is greatly reduced. For example, asphalt pellets may be cooled to a temperature ranging from below about 35°

F. to about 55° F. depending on the material used. By cooling the pellets of tacky, deformable material to such a temperature, the pellets can be more easily handled for distribution into composition 10.

The cooling of pellets 12 to a temperature that temporarily renders the material of the pellets non-tacky and hardened may be done in different ways depending on the type of pellet formation mechanism that is used. For example, if a prilling tower is used to form the pellets, the stream of air into which the droplets of the tacky, deformable material are dropped may be chilled to a temperature that temporally renders the material non-tacky and hardened before the pellets are collected and fed into composition 10. In any event, the cooling of the pellets can greatly facilitate distribution of pellets 12.

At the same time that pellets 12 are being distributed into a mixing container 58, fine material feeder 54 distributes fine material 14 into container 58. Fine material 14 may be provided by a process for creating fine material 14 to which fine material feeder 54 is attached. Alternatively, fine material 14 may come from pre-processed material. For example, bags of fine material 14 may be poured into a funnel from which fine material feeder 54 extends for feeding fine material 14 into composition 10.

Pellets 12 and fine material 14 fall onto rotating, vibrating platform 50 that is positioned within or proximal to an opening 59 of the mixing container 58. Rotating, vibrating platform 50 helps to mix fine material 14 and pellets 12 together so that pellets 12 are evenly dispersed within fine material 14. Fine material 14 fully occupies interstices 16 between pellets 12 to help create a composition that is easily flowable. The rotating, vibrating platform 50 vibrates back and forth in directions A and B to jostle pellets 12 and fine material 14 that land on a top surface 50a of rotating, vibrating platform 50. At the same time, rotating, vibrating platform 50 rotates in a direction C about an axis X. The rotation of platform 50 may be in either direction.

Platform 50 may be tilted at an angle ∝ to facilitate the mixture of pellets 12 and fine material 14 in mixing container 58 to create composition 10. As pellets 12 and fine material 14 hit platform 50, fine material 14 and pellets 12 slide in the direction E from an upper side 50b to a lower side 50c of rotating platform 50. As rotating, vibrating platform 50 rotates, lower side 50c travels around the axis X so that fine material 14 and pellets 12 are relatively evenly distributed within the mixing container 58 to create composition 10.

Mixing container 58 may be the final packaging or container in which composition 10 is to be shipped and/or sold for use. Mixing container 58 also may be a container that is only used to collect composition 10 as it is created. The composition within mixing container 58 may then be dispersed into other packaging for shipment and use.

Figure 5:
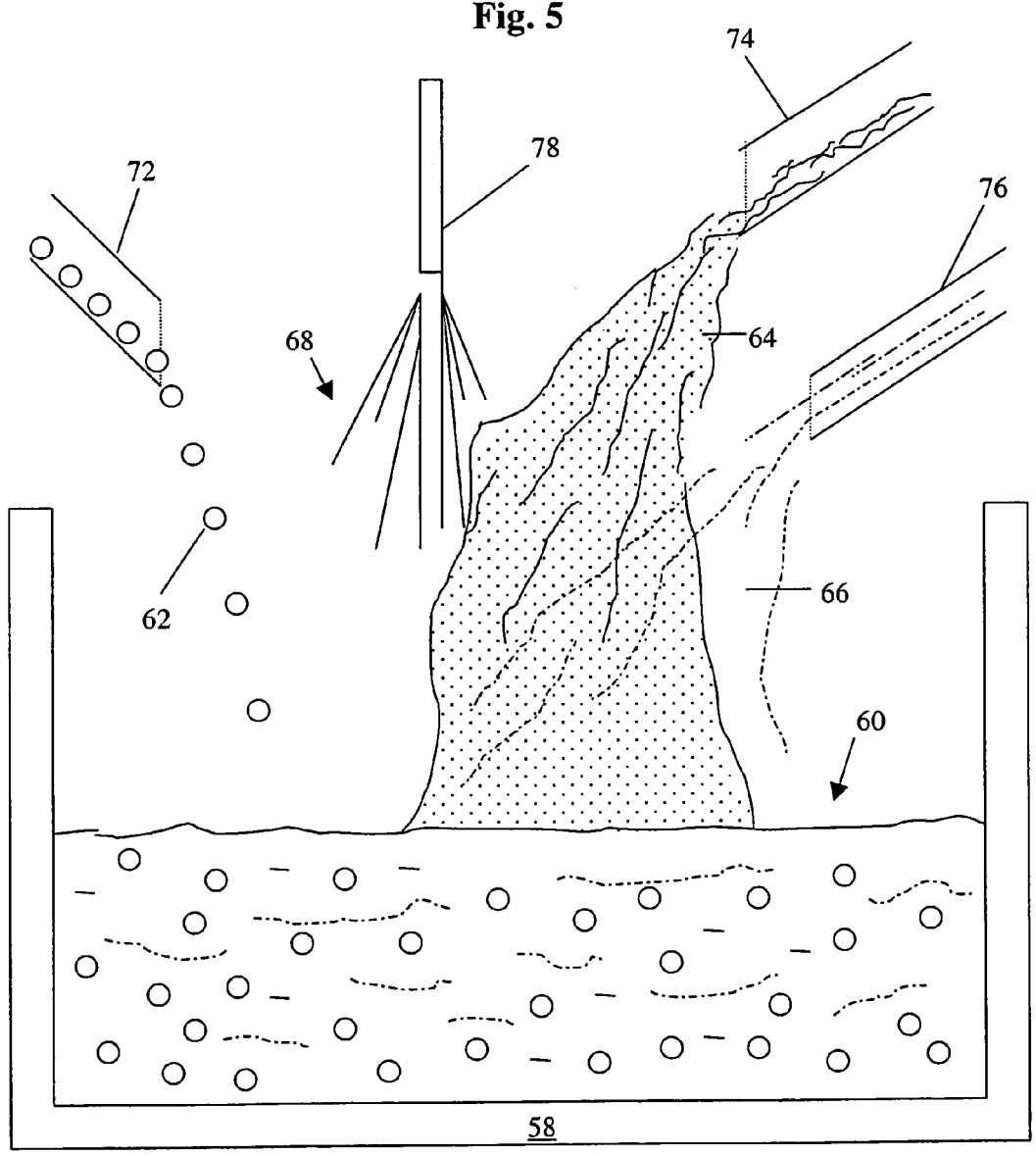
FIG. 5 illustrates a schematic view of a further embodiment of a process for creating a composition according to the present subject matter.

FIG. 5 illustrates a further embodiment of a process for making a composition, generally designated as 60. A composition 60 includes pellets 62 dispersed in a mixture of fine powder 64 and fibers 66. A liquid mist 68 may be sprayed into the mixture of pellets 62, powder 66, and fibers 66 to temporarily add cohesiveness and to cut down on dust creation.

A vibrating platform 70 is provided. Mixing container 58 is provided on the platform 70. A pellet feeder 72 feeds pellets 62 into the mixing container 58 to become part of the composition 60. A powder feeder 74 feeds fine powder 64 into mixing container 58 to also become part of the composition 60. Vibrating platform 70 shifts back and forth in directions A and B to facilitate the disbursement and separation of pellets 62 within the mixture of powder 64 and fibers 66 in mixing container 58. A fiber feeder 76 is also provided to supply fine fibers 66 to be included in composition 60. A sprayer 78 may provide liquid mist 68.

As described above with FIG. 4, the pellets created in FIG. 5 may be formed by an underwater pelletizing process. Other forms of creating the pellets such as prilling may be used to form the pellets. Pellets 62 can then be cooled either through chilling within a low temperature liquid or through other means. Powder 64 may be any suitable powder used in creating the intended composites material, which are listed above. Fibers 66 may be mineral and/or cellulosic fibers. The mixture of powder 64 and fibers 66 constitute the fine material within composition 60. The mixture is used to give composition 60 desired properties attributable to the specific powder used as well as the specific fibers being distributed into composition 60. Liquid mist 68 may be used as a stabilizer to help stabilize composition 60 during mixing and packaging. Liquid mist 68 may comprise water, latex, or other adhesive substance that will evaporate or breakup at some time before use of composition 60 to make the composite material.

Figure 6:
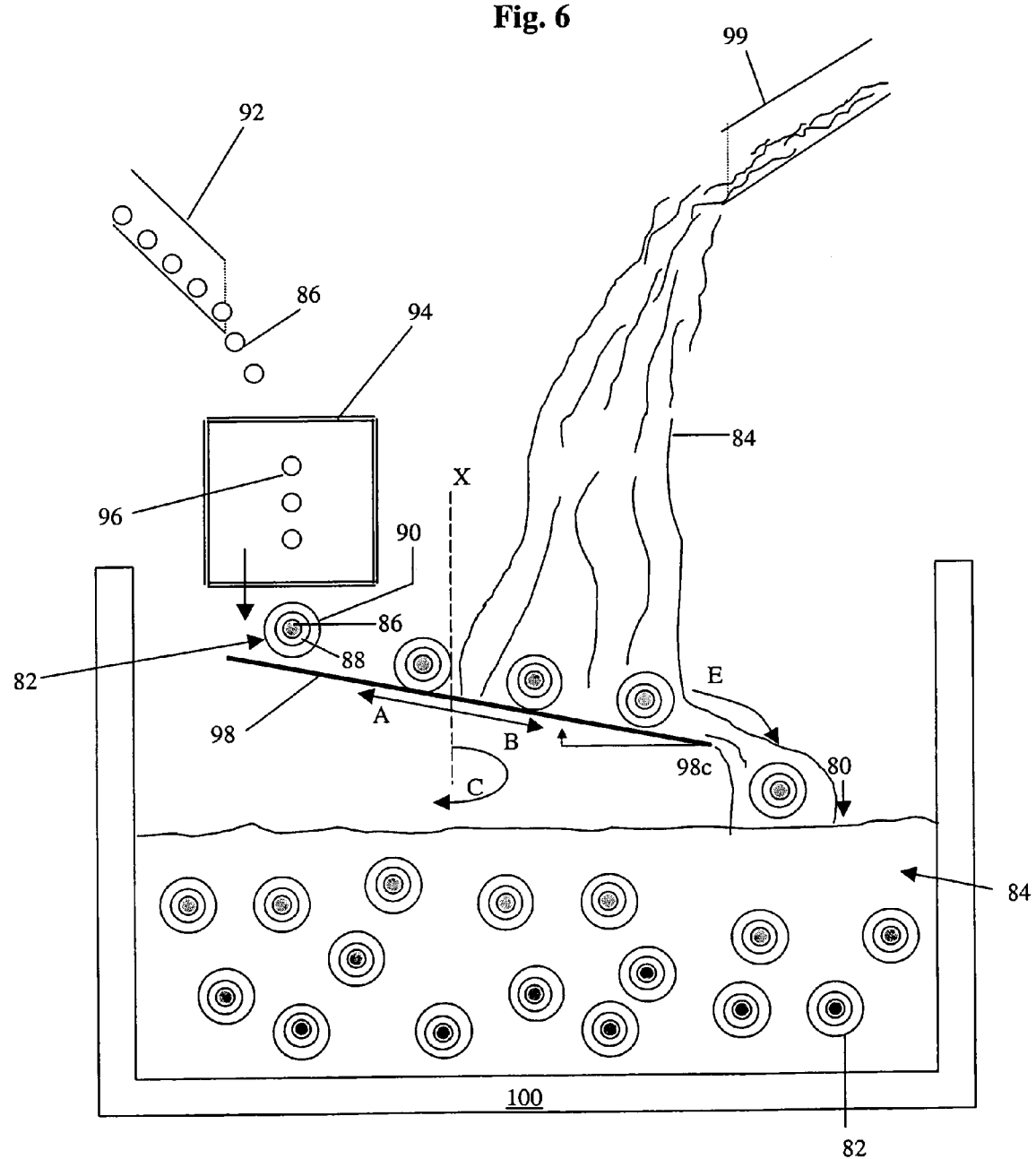
FIG. 6 illustrates a schematic view of an embodiment of a process for creating a composition of pellets of asphalt and a fine powder used in a final formula of an asphaltic mixture according to the present subject matter.

FIG. 6 shows a schematic view of a further embodiment of the process for creating a composition, generally designated as 80. Composition 80 includes coated pellets of asphalt 82 dispersed within a fine powder 84 such that fine powder 84 occupies the interstices between pellets 82 minimizing pellet to pellet contact. Pellets 82 comprise uncoated pellets 86 of asphalt material with an inner coating layer 88 and an outer coating layer 90. Uncoated asphalt pellets 86 are fed by pellet feeder 92 into a coating process 94. Coating process 94 may comprise a coating process similar to the process disclosed in U.S. Pat. No. 5,688,449 discussed above in reference to FIG. 3. Uncoated pellets 86 have been cooled to a temperature rendering the asphalt temporarily hardened and non-tacky in the pellet forming process. Pellet feeder 92 then feeds uncoated pellets 86 into two-step coating process 94. First, the pellets are covered with a polymer binder, for instance, by tumbling pellets 86 with the polymeric binder. The polymeric binder forms a first coating layer 88 around circumferences 96 of uncoated pellets 86. The second outer coating layer 90 may be applied by sprinkling a powdery fine material, such as a blowing agent, onto the coated pellets in the drum. For example, fine powder 84 may be used to create the second outer coating layer 90.

Alternatively, a single step coating process may be used to add the coating around asphalt pellets 86 to form a composition similar to the composition described with reference to FIG. 3. Other common coating methods may be used to create the coating, which covers the outside of asphalt pellets 86.

After pellets 86 are coated in coating process 94, coated pellets 82 are dispensed onto a rotating, vibrating platform 98. Simultaneously, fine powder 84 is distributed from powder feeder 99 onto vibrating, rotating platform 98 where coated pellets 82 and fine powder 84 are mixed together through the vibration in directions A and B of rotating, vibrating platform 98. As described in reference to FIG. 4, platform 98 can rotate in direction C, about an axis X. Further, platform 98 may be tilted at an angle ∝ to facilitate the moving of the mixture of coated pellets 82 and fine powder 84 off of platform 98 in a direction E. As platform 98 rotates in direction C, a lower side 98c of the platform disperses the mixture of fine powder 89 and coated pellets 82 such that coated pellets 82 are separated within fine powder 84 within mixing container 100.

Mixing container 100 may be the final packaging or container in which composition 80 is to be shipped and/or sold for use. The mixing container also may be a container that is only used to collect composition 80 as it is created. Composition 80 within mixing container 100 may then be dispersed into other packaging for shipment and use.

Composition 80 comprising coated pellets 82 within fine powder 84 can comprise part of a final mix to be used in asphaltic mixtures and the like. Fine powder 84 may be limestone or aggregate fines, which are used in the asphaltic mixture. The added fine powder 84 is used as part of the final formula for the asphaltic mixture. The mixture not only provides an opportunity to create the asphaltic mixture incrementally without using all of the composition to create a large batch but the composition also reduces the steps of making the final asphaltic mixture blend, which a user will have to perform in making asphalt pavement or concrete.

For example, a typical stone mastic asphalt ("SMA") mix may include;

124.2 pounds of AC 20 asphalt binder with SBS polymer mixed therein;

8 pounds of cellulosic fiber;

20 pounds of hydrated lime; and 1848 pounds of aggregate with 3 percent, or 55 pounds, of the aggregate being smaller than 0.0008 inches and 10 percent, or 185 pounds, of aggregate smaller than 0.003 inches and larger than 0.0008 inches.

By mixing the 20 pounds of hydrated lime, 8 pounds of fiber, 55 pounds of 0.0008 inch aggregate powder and 85 pounds of 0.003 inch aggregate powder, a mixture of 168 pounds of fine powder can be created. The 124.2 pounds of the asphalt binder can be formed into pellets in an underwater pelletizer. The pellets of the asphalt binder and the mixture of powder can then be simultaneously fed together to create a composition where the pellets of the tacky asphalt binder are dispersed within the mixture of powder such that the pellets are separated from each other and the powder fills the interstices between the pellets to create a composition to facilitate creation of SMA asphalt pavement or concrete.

This composition can then be mixed with 1708 pounds of aggregate. This amount of aggregate is an adjustment to take into account the material included in the composition. The aggregate has had its fines gradation adjusted to no aggregate smaller the 0.0008 inches and 100 pounds of aggregate between 0.0008 inches and 0.003 inches. The aggregate can be preheated to a normal temperature of 350° F. The 292.2 pounds of composition can then be mixed in the heated aggregate to create the SMA pavement or concrete. The heat from the aggregate causes the tacky, deformable pellets of asphalt binder to liquefy, thereby coating the aggregate and the powder, which helps to absorb the asphalt binder to create the SMA hot mix for pavement or concrete.

Figure 7:
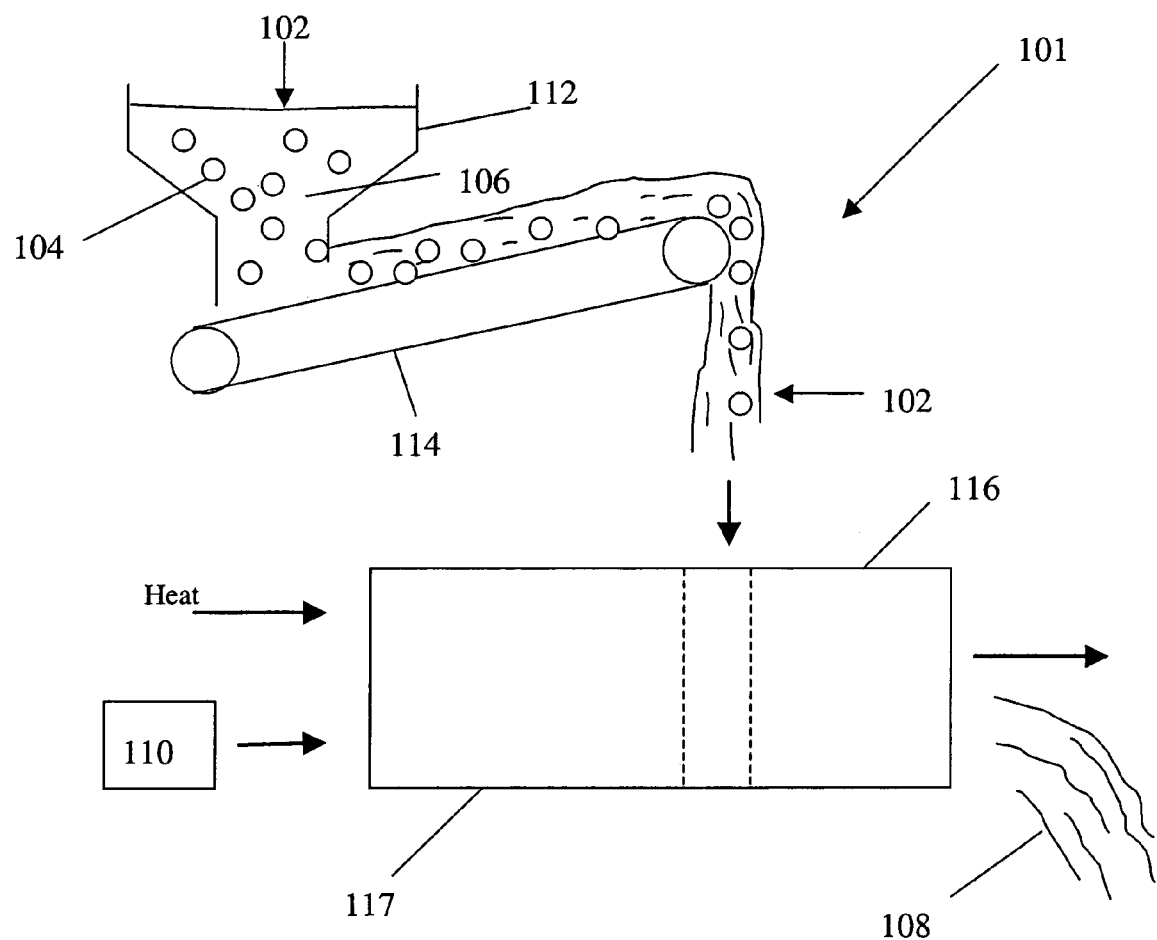
FIG. 7 illustrates a schematic view of a process for making an asphaltic mixture using a composition according to the present subject matter.

FIG. 7 illustrates a schematic of a process of creating hot mix asphalt ("HMA") or a SMA asphalt as described above. The process, generally designated as 101, includes placing a composition, generally designated as 102, of asphalt pellets 104 and fine powder 106 used in making the asphalt mixture 108 in with heated aggregate 110. Composition 102 is fed from a hopper 112 onto a conveyor 114, which transports composition 102 to a RAP port 116 of an asphalt drum mix plant 117. Aggregate 110, being earlier added to drum mix plant 117, is heated to a desired temperature. Drum mix plant 117 mixes composition 102 with aggregate 110 to create asphalt mixture 108.

As the composition 102 of asphalt pellets 104 and powder 106 are mixed with aggregate 110 within drum mix plant 117, asphalt mixture 108 is created. The heat within drum mix plant 117 and the heat now stored in aggregate 110 liquefies pellets 104 which then mix with fine powder 106 and aggregate 110 to make asphalt mixture 108.

By taking a portion of the fines normally used in the aggregate gradations to fill the interstices between the pellets, the asphalt can be transported and stored at ambient temperatures in pellet form. Thus, the need for a continuous heating of the asphalt is remove. Such measures can result in a significant energy savings.

The asphalt compositions describe above can also be used in making warm mix asphalt ("WMA") which has other additives added in to lower the temperature at which the asphalt may be created to eliminate the smell and pollutions created under normal hot mix asphalt conditions. The additives, which are used to create WMA asphalt, such as SASOBIT sold by SASOL WAX AMERICAS, INC. of Sheldon, Conn., may be included in the asphalt pellets. Further, if such additives are provided in powder form and are non-tacky, such additives may be included in the fine mixed powders within the composition.

Figure 8:
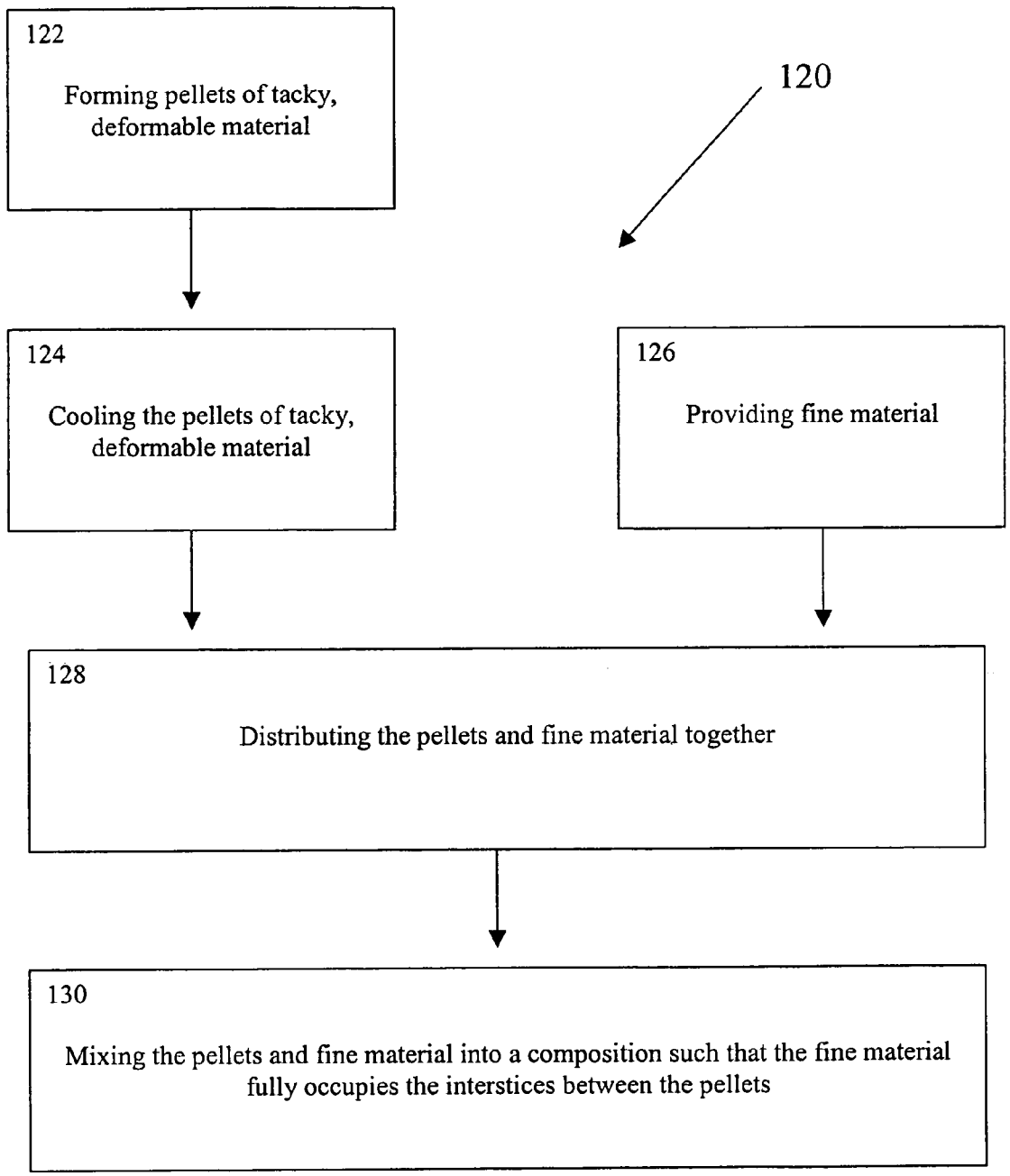
FIG. 8 illustrates a flow diagram of an embodiment of a process for creating a composition according to the present subject matter.

FIG. 8 shows a flow chart of an embodiment of a process, generally designated as 120, for creating a composition containing pellets of tacky, deformable material and a fine material, as discussed in detail above. To create the composition, the pellets are formed from tacky, deformable material in step 122. In step 124, the pellets are cooled to a temperature at which the pellets are temporarily rendered non-tacky and hardened. The fine material to be mixed with the pellets to create the composition is provided in step 126. Both the pellets of tacky, deformable material and the fine material are distributed simultaneously together into a mixing container in step 128. The pellets of the tacky, deformable material and the fine material are then mixed together such that the pellets of tacky, deformable material are separated from one another with the fine material occupying the interstices between the pellets and fully surrounding the pellets in step 130.

Figure 9:
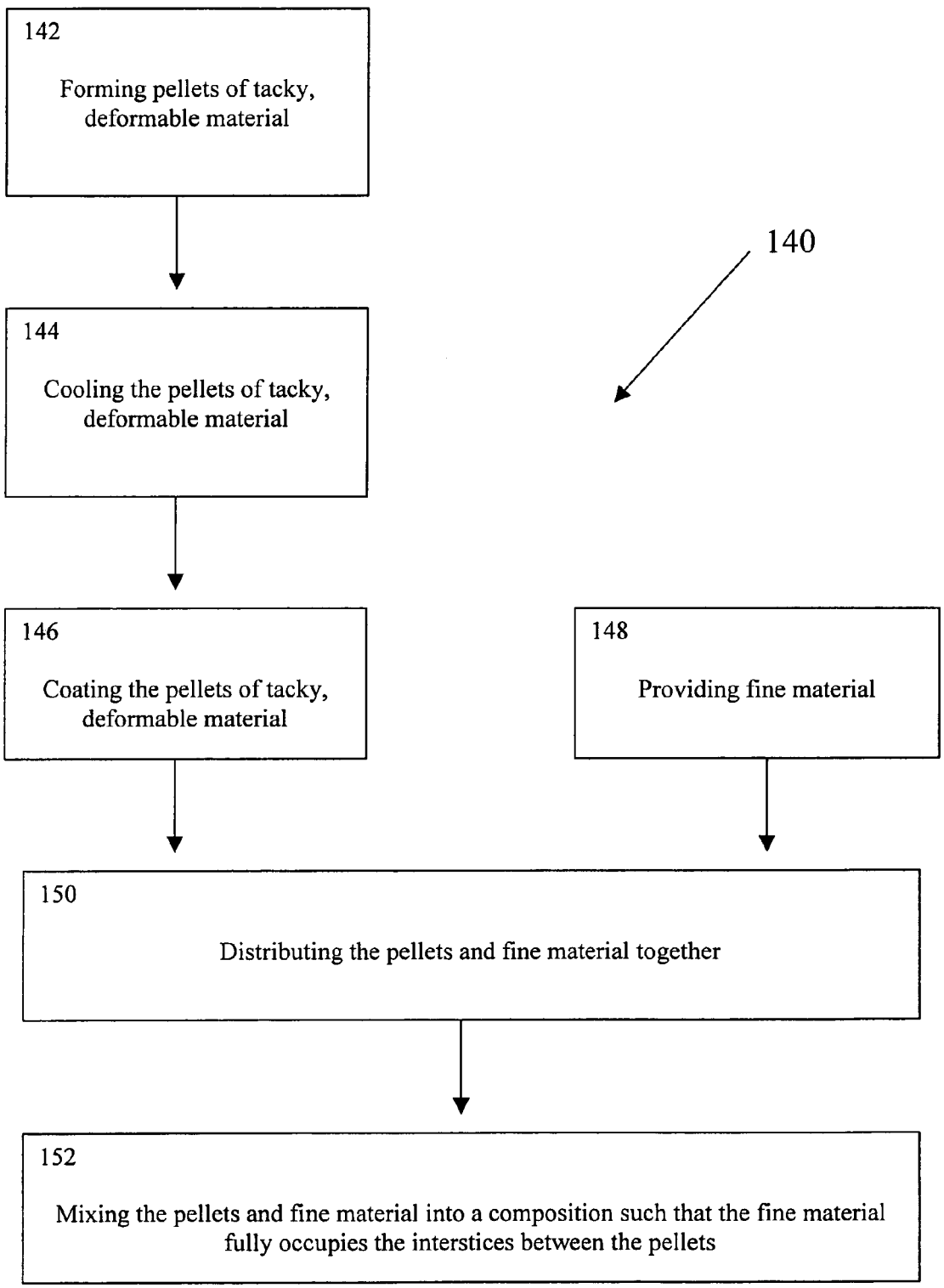
FIG. 9 illustrates a flow diagram of a further embodiment of a process for creating a composition according to the present subject matter.

FIG. 9 shows another flow chart of an embodiment of a process, generally designated as 140, in which to create the compositions described above. Process 140 includes a step 142 of forming pellets of tacky, deformable material such as asphalt. The pellets are cooled to a temperature that temporarily renders the pellets hardened and non-tacky in step 144. The pellets are then transferred to a coating process for coating the pellets with an outer coating material in step 146. In step 148, fine materials are provided which are to be mixed with the pellets to create the composition. The coated pellets and the fine material may then be distributed together in step 150. In step 152, the coated pellets and the fine material are then mixed together so that the pellets are separated from one another with the fine material occupying the interstices between the coated pellets, thereby surrounding the coated pellets.

EXAMPLES

The following are compositions of different performance-grade asphalt such as PG 76-22 asphalt from Associated Asphalt of Roanoke, Va. and PG 64-22 asphalt also from Associated Asphalt of Roanoke, Va. These asphalts were formed into pellets and mixed with different types of fine material that comprised boral-type F fly ash, lime, and cellulosic fiber. These mixtures were manufactured at Gala Industries, Inc. in Eagle Rock, Va. The samples were created by extruding the asphalt through an underwater pelletizer, which formed the pellets in a water box containing water at a temperature of about 45° F. The pellets were then fed and mixed in with the different fine material to create the desired composition.

The compositions were then shipped to Pavement Technology, Inc. of Covington, Ga. There, the compositions were then mixed with pre-heated aggregate to create an asphaltic mixture used in asphalt pavement and concrete. Each pre-heated aggregate mix used was 13,608 grams of an aggregate of 1½ inch crusher run aggregate from a LaFarge Quarry. The aggregate was preheated to 340° F. in an oven and then deposited into a pugmill mixer. 1,512 grams of each composition at room temperature were added to 13,608 grams of preheated aggregate. The pugmill mixer was then operated for approximately 1 minute and the mix was discharged from the mixer into a pan for examination. A lab technician then examined the mix to summarize the coating of the aggregate by the asphalt/fine material mixture and also to judge the appearance of the mix.

Example 1

A mixture of 50 parts fly ash and 50 parts PG 76-22 asphalt pellets was provided for testing. It was observed that the pellets after shipping separated well while being removed from the shipping container and poured into the mixer with the hot aggregate. Once heated with the aggregate and mixed therewith for approximately one minute, the mix of fly ash and PG 76-22 asphalt coated the aggregate well, providing about 98% coating when discharged from the pugmill mixer. The mix had a glossy appearance.

Example 2

Example 2 comprised 44 parts of PG 76-22 asphalt pellets surrounded and separated by 56 parts lime within the composition. The pellet separation when dispersed from the shipping container was good to fair. When mixed with the aggregate within the mixer, the pellets appeared to melt and disperse well and provided about 96% coating of the aggregate when discharged from the pugmill mixer after mixing. The mix had a dry, dead appearance.

Example 3

Example 3 comprised 50 parts PG 76-22 asphalt pellets separated and surrounded in a fine material comprising 25 parts lime and 25 parts fly ash. The pellets separated well upon removal from the shipping container. Upon mixing with the aggregate, the pellets appeared to melt and disperse well and provided about 95% coating of the aggregate when the mix was discharged from the pugmill mixer. The mix had a dry, dead appearance.

Example 4

Example 4 was a composition having 50 parts PG 64-22 asphalt pellets separated and surrounded by fine material comprising 25 parts lime and 25 parts fly ash. The pellet separation was fair to poor when being removed from the shipping container due to a settling out of the contents of the composition. The pellets appeared to melt and disperse well once added to the heated aggregate and provided about 99% coating when discharged from the pugmill mixer. The mix had a glossy appearance.

Example 5

Example 5 was a composition comprising 50 parts pellets of PG 76-22 asphalt pellets and a fine material having 25 parts lime and 25 parts fly ash as well as 2.5 parts cellulosic fibers and 2.5 parts mineral fibers. The pellets separated well when removed from the shipping container. The fiber had a tendency to cling to the pellets. The pellets and fiber appeared to melt and disperse well when mixed with the aggregate and provided about 93% coating when discharged from the pugmill mixer. The mix had a dry, mealy appearance.

Example 6

Example 6 was a composition comprising 50 parts PG 76-22 asphalt in pellet form in which the pellets were surrounded and separated by a fine material mixture of 50 parts lime and 2.5 parts cellulosic fibers and 2.5 parts mineral fibers. The pellets had good separation when being removed from the shipping container. The fibers had a tendency to stick to the pellets. Once added to the aggregate, the pellets and fiber appeared to melt and disperse well. The aggregate coating was about 87% once removed from the mixer. The mix had a very dry appearance.

The embodiments of this invention shown in the drawings and described above are exemplary of numerous embodiments that may be made within the scope of the appending claims. It is contemplated that the numerous other configurations of the composition of pellets of tacky, deformable material and fine material may comprise numerous materials other than those specifically disclosed. In short, it is applicants' intention that the scope of the patent issuing herefrom will be limited only by the scope of the appended claims.

What is claimed is:

1. A composition of discrete substances that are capable of being mixed together to form a composite material, the composition comprising a plurality of pellets of a tacky, deformable material dispersed within a flowable fine material such that the fine material occupies the interstices between the plurality of pellets in a manner that minimizes pellet to pellet contact.

2. A composition as in claim 1, wherein the tacky, deformable material comprises asphalt.

3. A composition as in claim 2, wherein the asphalt comprises at least one of bituminous material, polymeric asphalt, asphaltum, uintaite, uintahite, a hydrocarbon resin, or a asphalt binder.

4. A composition as in claim 1, wherein the pellets of tacky, deformable material are temporarily cooled to a temperature that renders the tacky, deformable material non-tacky before insertion of the plurality of pellets into the fine material.

5. A composition as in claim 1, wherein each of the pellets of tacky, deformable material has a coating covering an outer circumference of the pellet.

6. A composition as in claim 1, wherein the pellets of tacky, deformable material has a first coating of a polymeric resin and a second coating of a dusting of a fine material about the first coating.

7. A composition as in claim 1, wherein the fine material comprises at least one of a powder or fibrous material.

8. A composition as in claim 7, wherein the powder comprises at least one of limestone, mineral fines, aggregate fines, fly ash, hydrated lime, sulfur, uintaite, uintahite, or ground rubber.

9. A composition as in claim 7, wherein the fibrous material comprises at least one of cellulosic fibers or mineral fibers.

10. A composition as in claim 7, wherein the powder has a fineness that permits passage through a sieve containing 0.187 inch openings.

11. A composition as in claim 7, wherein the powder has a fineness that permits passage through a sieve containing 0.023 inch openings.

12. A composition as in claim 1, wherein the pellets of tacky, deformable material comprise about 50% by volume of the composition and the fine material comprise about 50% by volume of the composition.

13. A composition as in claim 1, wherein the pellets of tacky, deformable material comprise about 50% by weight of the composition and the fine material comprise about 50% by weight of the composition.

14. A composition as in claim 1, wherein the composition comprises at least about 25% by weight of the fine material.

15. A composition as in claim 1, wherein the composition comprises at least about 25% by weight of the pellets of tacky, deformable material.

16. A composition as in claim 1, wherein the composition of the pellets of tacky, deformable material and the fine material is at least a portion of a final formula of ingredients for the composite material.

17. A composition of discrete substances used in a final formula of an asphaltic mixture, the composition comprising a plurality of pellets of an asphalt dispersed within a flowable fine material such that the fine material occupies the interstices between the plurality of pellets in a manner that minimizes pellet to pellet contact.

18. A composition as in claim 17, wherein the asphalt material comprises at least one of bituminous material, polymeric asphalt, asphaltum, uintaite, uintahite, a hydrocarbon resin, or a asphalt binder.

19. A composition as in claim 17, wherein the fine material comprises at least one of a powder or fibrous material.

20. A composition as in claim 19, wherein the powder comprises at least one of limestone, mineral fines, aggregate fines, fly ash, hydrated lime, sulfur, or ground rubber.

21. A composition as in claim 19, wherein the fibrous material comprises at least one of cellulosic fibers or mineral fibers.

* * * * *